United States Patent
Oroskar et al.

(10) Patent No.: US 8,942,738 B1
(45) Date of Patent: Jan. 27, 2015

(54) ADJUSTMENT OF ZONE-BASED PAGING BASED ON THE PREVALENCE OF ECSFB DEVICES

(71) Applicant: Sprint Spectrum L.P., Overland Park, KS (US)

(72) Inventors: Siddharth S. Oroskar, Overland Park, KS (US); Jasinder P. Singh, Olathe, KS (US); Anoop K. Goyal, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 163 days.

(21) Appl. No.: 13/648,918

(22) Filed: Oct. 10, 2012

(51) Int. Cl.
*H04W 68/00* (2009.01)

(52) U.S. Cl.
USPC .......................... 455/458; 455/426.1; 455/515

(58) Field of Classification Search
CPC . H04W 36/0022; H04W 88/06; H04W 36/14; H04W 68/12; H04W 76/026; H04W 60/005; H04W 92/02; H04W 36/0061; H04W 36/0016; H04W 36/0027; H04W 36/0066; H04W 36/0088; H04W 36/06; H04W 36/16
See application file for complete search history.

(56) References Cited

U.S. PATENT DOCUMENTS

| | | | |
|---|---|---|---|
| 8,160,619 B1 * | 4/2012 | Oroskar et al. | 455/458 |
| 8,306,558 B1 * | 11/2012 | Oroskar et al. | 455/458 |
| 8,611,897 B2 * | 12/2013 | Pudhey et al. | 455/434 |
| 8,682,357 B2 * | 3/2014 | Worrall | 455/458 |
| 2002/0132586 A1 | 9/2002 | Chen | |
| 2008/0207227 A1 * | 8/2008 | Ren et al. | 455/458 |
| 2008/0254814 A1 * | 10/2008 | Harris et al. | 455/458 |
| 2009/0082041 A1 | 3/2009 | Ranganathan | |
| 2011/0195714 A1 * | 8/2011 | Sawinathan | 455/435.1 |
| 2011/0268109 A1 | 11/2011 | Miyata | |
| 2012/0028661 A1 * | 2/2012 | Fang et al. | 455/466 |
| 2012/0064884 A1 | 3/2012 | Ramachandran | |

* cited by examiner

*Primary Examiner* — Liton Miah

(57) ABSTRACT

Disclosed herein are methods and systems that may help to determine and/or adjust parameters for zone-based paging over CDMA paging channels, based on the prevalence of devices that are configured for enhanced circuit switch fallback (eCSFB) in one or more paging zones. For example, a switch in a radio access network (RAN) may: (a) determine a respective measure of CSFB-device prevalence in one or more paging zones in the RAN, (b) use the respectively determined measure of CSFB-device prevalence in at least one of the paging zones as a basis to determine one or more parameters for zone-based paging in the at least one of the paging zones, and (c) apply the one or more determined parameters for zone-based paging in the at least one of the paging zones.

19 Claims, 4 Drawing Sheets

ADJUSTMENT OF ZONE-BASED PAGING BASED ON THE PREVALENCE OF ECSFB DEVICES

BACKGROUND

To provide cellular wireless communication service, a wireless service provider or "wireless carrier" typically operates a radio access network (RAN) that defines one or more coverage areas in which WCDs can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), Long-Term Evolution (LTE), TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

Overview

In networks that provide service under both Long-Term Evolution (LTE) and an older CDMA protocol (e.g., IS-2000 and/or IS-856), service providers may implement circuit switch fallback (CSFB) and/or enhanced circuit switch fallback (eCSFB) functionality, which allow service providers to use their older existing CDMA network for voice calls, while at the same time using LTE to support mobile broadband.

Under CSFB, a wireless communication device may, by default, operate with its CDMA receiver powered down, and only listen for pages via an LTE paging channel. Thus, when a radio access network (RAN) needs to page a wireless communication device for a voice call, the RAN may first page the wireless communication device via an LTE paging channel. This indicates to the wireless communication device that it should turn on its CDMA receiver and listen to the CDMA paging channel for a page. The RAN can then send the page via the CDMA paging channel. Thus, a wireless communication device operating under CSFB may keep its CDMA receiver powered down, except when it is about to receive a page via the CDMA paging channel.

When eCSFB is implemented, a radio access network (RAN) may generally use its 3G traffic channels for voice calls and 1x-data calls, while using LTE signaling channels for all other functionality. As a result, a base station that implements eCSFB may use the LTE control channel for both LTE control channel messages and CDMA control-channel and paging-channel messages (e.g., for CDMA paging, CDMA call origination, SMS, CDMA feature notification, and other CDMA overhead message), whenever the device with which it is communicating is compatible with such functionality. Configured as such, the base station does not use the CDMA paging and access channels, unless the base station is communicating with a device that is not capable of communicating under LTE, in which case, the base station may revert to use of the CDMA paging and access channels.

Note also that there may be LTE-capable devices that are not configured for eCSFB, and thus do not know to listen to the LTE paging channel for CDMA pages. As such, a RAN may refrain from implementing CSFB and/or eCSFB for such devices, and CDMA pages thus be sent to such devices via the CDMA paging channel.

Herein, wireless communication devices (WCDs) that are capable of LTE communications, and thus capable of operating according to eCSFB, may be referred to as "CSFB devices" or "eCSFB WCDs." On the other hand, WCDs that are not capable of LTE communications and thus utilize CDMA paging and access channels, may be referred to herein as "non-CSFB devices" or "non-eCSFB WCDs."

As the number of CSFB devices increases, both the CDMA paging channel occupancy (PCO) and the access channel occupancy (ACO) may decrease due to reduced usage of the paging channel and access channel. Accordingly, exemplary embodiments may help take advantage of such reduced paging- and access-channel usage in an effort to improve the service provided to non-CSFB devices. For instance, when a higher number or percentage of CSFB devices is detected in a paging zone, zone-based paging parameters for the paging zone's CDMA paging channels (i.e., the CDMA paging channels in the sectors included in the paging zone) may be adjusted so as to increase the paging success rate (PSR) via the CDMA paging channels. Such adjustments may also increase the PCO for the CDMA paging channels, but the increased PCO may be offset at least partially by the increased presence of CSFB devices and the corresponding reduction to the PCO that is expected to result therefrom.

In one aspect, an exemplary method may be implementing by a component of a RAN that is configured for eCSFB, wherein the RAN includes a plurality of paging zones that comprise one or more coverage areas, and wherein the RAN is configured to send a given page type to non-CSFB devices via one or more first paging channels defined under a first air-interface protocol and to send the given page type to CSFB devices via one or more second paging channels defined under a second air-interface protocol. The method involves the RAN component: (a) determining, for each of one or more of the paging zones, a respective measure of CSFB-device prevalence in the paging zone; (b) using the respectively determined measure of CSFB-device prevalence in at least one of the paging zones as a basis for determining one or more parameters for zone-based paging in the at least one of the paging zones; and (c) applying the one or more determined parameters for zone-based paging in the at least one of the paging zones.

In another aspect, a non-transitory computer readable medium may have stored therein instructions that are executable to cause a RAN to perform functions comprising: (a) determining, for each of one or more paging zones of the RAN, a respective measure of CSFB-device prevalence in the paging zone, wherein the RAN is configured for eCSFB and includes a plurality of paging zones that each comprise one or more coverage areas, and wherein the RAN is configured to send a given page type to non-CSFB devices via one or more first paging channels defined under a first air-interface protocol and to send the given page type to CSFB devices via one or more second air-interface protocol; (b) using the respectively determined measures of CSFB-device prevalence in at least one of the paging zones as a basis for determining one or more parameters for zone-based paging in the at least one of the paging zones; and (c) applying the one or more determined parameters for zone-based paging in the at least one of the paging zones.

In a further aspect, a RAN component may include a non-transitory computer readable medium and program instructions stored on the non-transitory computer readable medium. The program instructions may be executable by at least one processor to: (a) determine, for each of one or more paging zones of the RAN, a respective measure of CSFB-device prevalence in the paging zone, wherein the RAN is configured for eCSFB and includes a plurality of paging zones that each comprise one or more coverage areas, and wherein the RAN is configured to send a given page type to non-CSFB devices via one or more first paging channels defined under a first air-interface protocol and to send the given page type to CSFB devices via one or more second paging channels defined under a second air-interface protocol; (b) use the respectively determined measure of CSFB-device prevalence in at least one of the paging zones as a basis to determine one or more parameters for zone-based paging in the at least one of the paging zones; and (c) apply the one or more determined parameters for zone-based paging in the at least one of the paging zones.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Exemplary Network Systems

Figure 1:
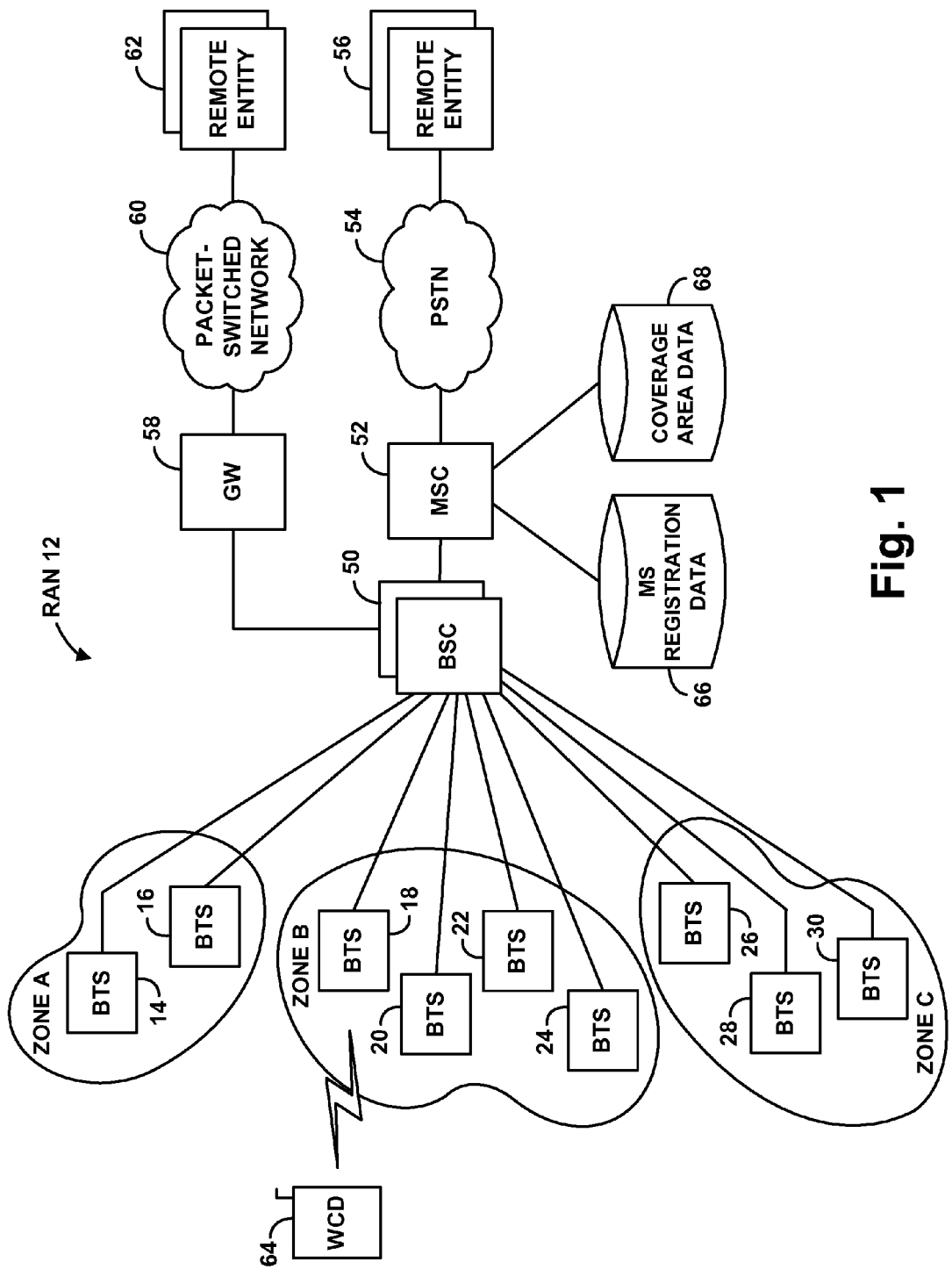
FIG. 1 is a block diagram illustrating a wireless communication network, according to an exemplary embodiment.

Referring to the Figures, FIG. 1 is a block diagram illustrating a wireless communication network, according to an exemplary embodiment. As noted, service providers may implement networks in which service is provided under a CDMA standard (e.g., IS-95, IS-2000, 1xRTT, 1xEV-DO, etc.) as well as under a 4G protocol such as LTE and/or WiMax. Service under both CDMA and LTE (or WiMAX) may be implemented in conjunction with the arrangement shown in FIG. 1, and more specific details of a network with overlapping CDMA and LTE will be discussed in reference to FIG. 2.

As shown in FIG. 1, an exemplary network may include a radio access network (RAN) 12 that radiates to define numerous coverage areas in which wireless communication devices (WCDs) can engage in RF communication with the RAN. Herein, WCDs may also be referred to as "mobile stations," as is common when referring to WCDs in the context of a CDMA network, and also as "user entities" (UEs), as is common when referring to WCDs in the context of an LTE network. Thus, the terms "mobile station," "wireless communication device" (or WCD), and "user entity" (or UE) may be used interchangeably herein. Further, a WCD may be classified herein based on whether or not it is configured for circuit switch fallback (CSFB) and/or enhanced circuit-switched fallback (eCSFB) functionality, and thus may be referred to as either an "CSFB device" or a "non-CSFB device."

The RAN 12 may define these coverage areas discretely through use of directional antennas and/or by various modulation parameters, including, without limitation, carrier frequencies, PN offsets, and/or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include one or more base stations (also referred to as "base transceiver stations" (BTSs)), designated in the figure as base stations 14-30, and one or more base station controllers (BSCs) 50 (which may be integrated with or separate entities from the one or more of the base stations). The base stations preferably include directional antennas, power amplifiers, and associated transceiver equipment arranged to establish corresponding wireless coverage areas and to communicate with WCDs in those coverage areas.

The coverage areas served by base stations 14-30 may be cell sectors, or some other defined wireless coverage area (possibly even a combination of coverage provided by multiple base stations). Each base station 14-30 may serve a single coverage area (e.g., a single cell or sector), or may serve multiple discrete coverage areas, such as multiple sectors, for instance.

Each base station controller may be coupled with one or more switches, such as a mobile switching center (MSC) 52, which provides connectivity with the public switched telephone network (PSTN) 54, so that served WCDs can communicate with remote entities 56 on the PTSN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

Note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

FIG. 1 depicts a representative WCD 64 by way of example, which could be a cell phone, tablet, laptop computer, wirelessly equipped personal digital assistant (PDA), personal computer, home electronic device, or any other type of wirelessly-equipped device now known or later developed. The WCD 64 is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above.

Further, a WCD 64 may include a user interface, which typically includes components for receiving input from a user of a WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Note that when referring to a CDMA network, wireless communication devices (WCDs) may often be referred to as "mobile stations." In other protocols, WCDs may be referred to using different terminology. For example, under LTE, WCDs may be referred to as "user entities" (UEs).

Each mobile station, such as WCD 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN).

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

Figure 2:
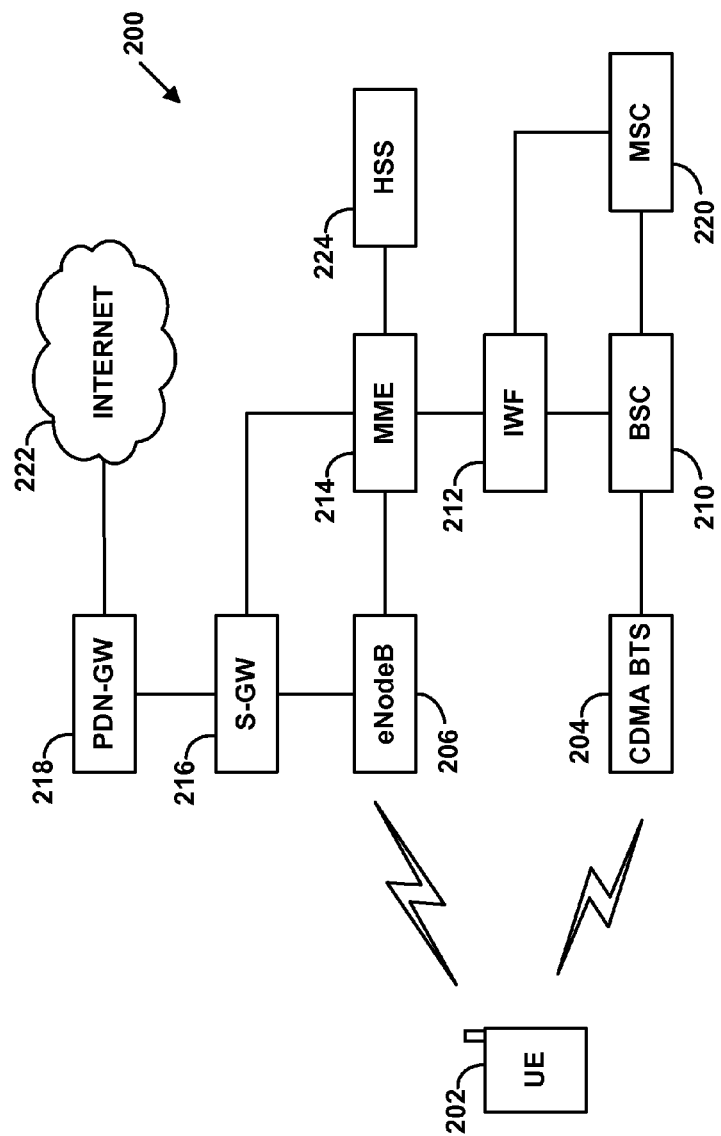
FIG. 2 is a simplified block diagram of a wireless communication network 200 in which a service provider supports wireless service under two or more different air interface protocols.

As noted above, FIG. 2 is a simplified block diagram of a wireless communication network 200 in which a service provider supports wireless service under two or more different air interface protocols. In particular, FIG. 2 shows an exemplary RAN that is configured to provide service under both CDMA and LTE. As such, a UE 202 operating in network 200 may connect and communicate under different air-interface protocols, such as CDMA and LTE. In practice, network 200 may include two or more separate access networks with overlapping coverage areas (e.g., separate access network for LTE and CDMA). Alternatively, some or all components may be combined so as to support both CDMA and LTE communications, for example.

In the illustrated configuration, network 200 includes components to provide for CDMA communications. Specifically, FIG. 2 shows a BTS 204, a BSC 210, and an MSC 220, which collectively (and possibly in conjunction with other components that help to provide service under CDMA) may be referred to as a CDMA network. Note that BTS 204, BSC 210, and MSC 220 may be configured for the same or similar functions as BTSs 14-30, BSC 50, and MSC 52, which were described in reference to FIG. 1.

Network 200 also includes components to provide a UE 202 with service under LTE. In particular, network 200 includes one or more eNodeBs 206, which are base stations configured to support over-the-air communications with UEs 202 under LTE. Each eNodeB 206 may provide service under LTE in one or more coverage areas, such as a cell or one or more cell-sectors.

To support LTE communications, network 200 also includes a mobility management entity (MME) 214, which may be configured to control communications between one or more eNodeBs 206 and a serving gateway (S-GW) 216. MME 28 may also be communicatively coupled to a home subscriber server (HSS) 224, which stores subscriber information, such as information related to UE 202. More generally, an MME 214 may support functionality such as mobility management, bearer management, paging-message distribution, security functions, authentication of UEs, gateway selection for communications, and so on.

In an exemplary configuration, S-GW 216 may be configured to communicate with one or more eNodeBs 206 and/or with MME 214 in order to provide various functions such as packet routing and forwarding, mobility anchoring, packet buffering, and so on. For instance, S-GW 216 may provide packet routing for LTE communications to and/or from UE 202. Yet further, an LTE access network may include a packet data network gateway (PDN-GW) 218, which facilitates packet-data communications between an S-GW 216 that operates according to LTE, and a packet-data network, such as the Internet 222.

In a further aspect, network 200 includes an interworking function (IWF) 212, which may be a functional component of the network that supports interworking between different wireless technologies, such as CDMA and LTE. In an exemplary configuration, IWF 212 may support communications between components of an LTE network (e.g., MME 214) and components of a CDMA network (e.g., BSC 210 and/or MSC 220), so that a service provider may implement circuit-switched fallback (CSFB) or enhanced circuit-switched fallback (eCSFB) functionality.

CSFB and eCSFB may allow a service provider to deliver voice-services to a UE 202, and/or to provide data provide data services under a CDMA protocol to UE 202, which is not configured for LTE communications. The LTE network and the CDMA network (e.g., the fall back network) may be connected via a tunnel, such as IWF 212.

A UE 202 that is configured for CSFB or eCSFB may register with the CDMA-portion of network 200 via an LTE access channel. More specifically when a UE 202 connects to a LTE network via an eNodeB 206, it can communicate with a CDMA MSC 220 through an IWF 212, which functions to bridge the LTE and CDM networks, encapsulate and relay CDMA messages between the UE 202 and the MSC 220. For example, a UE 202 may send CDMA messages via an eNodeB 206 and an MME 214. The IWF 212 may then encapsulate and relay such CDMA messages to MSC 220.

Further, a UE 202 that is configured for eCSFB may use an LTE access channel to initiate a voice call under CDMA. For instance, when a CSFB device requests to initiate a voice call via an LTE access channel, the LTE network may then notify the CDMA network of the voice call via the bridge provided by IWF 212, so that the call may be established via the CDMA network. For example, MME 214 may notify MSC 220 of UE 202's request to initiate a voice call via IWF 212, so that MSC 220 may reserve CDMA resources for the call.

Yet further, under eCSFB, all paging functionality for both CDMA and LTE communications may be carried out via the LTE paging channel, unless the target UE of the paged is not configured for eCSFB, in which case the CDMA paging channel is used instead. Thus, if most of UEs in a certain geographic area are configured for eCSFB, the number of paging-channel messages being sent via the CDMA paging channel may be significantly reduced.

In another aspect of eCSFB, UEs 202 that are configured for eCSFB may search for an LTE pilot signal first, and only search for a CDMA pilot signal when an LTE pilot signal is unavailable. In addition, eCSFB UEs may use the LTE access channels for all access functionality, such as sending access probes, unless LTE is unavailable. Therefore, if most of UEs 30 in a certain geographic area are configured for eCSFB, the number of access probes being sent via a CDMA paging channel may be significantly reduced. Advantageously, such eCSFB functionality may help a UE 30 to conserve power. In particular, rather than simultaneously using two wireless communication interfaces (e.g., one for LTE communications and one for CDMA communications), eCSFB may allow a UE 202 to turn its CDMA communication interface off at most times.

It should be understood that the network arrangements shown in FIGS. 1 and 2 and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

II. CDMA Paging Functionality

In a RAN that is configured for eCSFB, the RAN may still use the CDMA paging channel to page a WCD that is not capable of LTE communications, and/or that is not configured for eCSFB, and thus does not know to listen to the LTE paging channel for both CDMA and LTE pages. Accordingly, a more detailed explanation of CDMA paging is provided below.

Under CDMA, when a RAN seeks to communicate with a WCD (e.g., to establish an incoming voice call or transmit incoming packet data to a WCD), the RAN may first page the WCD on a CDMA paging channel. The purpose of paging the WCD may be to determine whether the WCD is still within range of a preferred wireless coverage area, and if so, to notify the WCD of the incoming communication. If the WCD is successfully paged, the RAN may assign one or more traffic channels to WCD.

The paging channel may operate in a slotted manner, according to time-division multiplexing (TDM), and multiple WCDs may be grouped together and assigned to the same paging channel slot. Each paging channel slot is typically divided into four frames, each of which comprises two half-frames, resulting in a total of eight half-frames per paging channel slot. In a given paging channel slot, the RAN may transmit one or more general paging messages (GPMs), each containing information sufficient to identify which WCD or WCDs of the group (if any) are being paged. Thus, a WCD served by a given wireless coverage area may periodically listen to its assigned paging channel slot to determine whether the RAN is seeking to page the WCD.

Paging is typically initiated when an MSC receives an indication that a WCD should be paged (e.g., an incoming call), or when the MSC itself determines that a WCD should be paged. The indication normally includes a WCD identifier, such as a Network Access Identifier (NAI), a Mobile Directory Number (MDN), a Mobile Identification Number (MIN), an International Mobile Subscriber Identifier (IMSI), an electronic serial number (ESN), and/or a mobile equipment identifier (MEID). The MSC may then transmit some representation of the indication to the appropriate BTS or BTSs.

In turn, the BTS may use the WCD identifier to generate a page record, which the BTS may then place in a GPM for transmission to the WCD. (A GPM may also be referred to as a "page-request message" or just a "page.") The WCD may then reply with to the BTS with a page-response message (PRM) sent via a reverse-link access channel. After receiving the PRM and verifying the page was successfully received, the RAN may then assign one or more traffic channels to the WCD.

Referring again to FIG. 1, a RAN 12 will typically resend a page (and possibly do so a number of times) when a page fails to reach (or seemingly fails to reach) the intended WCD. More specifically, when a RAN does not receive a PRM from a WCD, the switch (e.g., MSC 52) in the serving system preferably attempts to re-page the WCD. In particular, an MSC 52 may wait a predetermined period of time (ten seconds, for instance) to receive an indication from a base station, which indicates a page response message has been received. If the MSC 52 does not receive such an indication, the MSC will resend the page to the base station to again be transmitted to the WCD. The MSC typically repeats this process until a page response message indicates that the page was successfully received, or until a maximum number of attempts has been made without receiving a PRM, and the page is deemed to have failed.

In an exemplary embodiment, a switch may have various paging-scheme settings that affect the manner in which the switch resends a page. In particular, the switch may define a "maximum-attempt" parameter, the value of which indicates the maximum number of attempts that can be made to send a given page. Further, the switch may track the "paging-attempt status" of a given page; which may also be referred to as the switch's "attempt count" for the page (i.e., how many attempts have been made by the switch to send the page). For example, an MSC may include, maintain, or have access to a database that tracks the paging-attempt status of pages initiated by the MSC. As such, when a page is successfully received at the intended WCD, and a PRM is received at the base station from which the page was sent, this may be relayed to the switch. The switch then knows not to initiate additional attempts to send the page and refrains from sending pages out to the base station from making additional attempts to send out the page. On the other hand, if the switch does not receive an indication that the page was successful from any base station, the switch will check the paging-attempt status, and if appropriate, send the page to one or more base stations for transmission in their respective coverage areas.

In addition, the switch may implement a "page-attempt timer," which the switch uses to determine when to make a subsequent paging attempt. Accordingly, if additional attempts to send the page are possible after the switch makes an attempt to send the page (i.e., if the attempt count for the page is less than the maximum-attempt value after the switch sends an indication to one or more base stations to page the WCD), the switch starts the page-attempt timer. Then, if no acknowledgement has been received from the WCD when the page-attempt timer expires, the switch initiates the next attempt to send the page.

In a further aspect, given the scarcity of paging channel resources in most modern cellular networks, paging across multiple sectors is typically implemented with a more-targeted paging process that is commonly referred to as "zone-based paging." With zone-based paging, a cellular network is divided into paging zones, each with a respective zone ID, and paging is performed on a zone-basis. To facilitate this, each base station (e.g., BTS 106) in the system may broadcast as one of its overhead parameters the zone ID for the zone in which the base station is located. A WCD 64 operating in the network may then programmatically monitor the zone IDs indicated in the overhead messages and may automatically register with the network when they detect that they have moved into a new zone, or for other reasons. With this process, the registration records thereby maintained by switches and/or home location registers will indicate the paging zone in which each WCD last registered.

When a switch (e.g., MSC 52) seeks to page a WCD, the switch may then efficiently send the page message to just those base stations that are within the zone of the WCD's last registration, as it is likely that the WCD is in that zone. Further, the switch may send the page message to the base stations in zones adjacent to the WCD's zone of last registration, to cover the possibility that the WCD has moved to a new zone but has not yet registered its presence in the new zone.

In a further aspect, FIG. 1 illustrates a portion of a coverage area of radio access network 12, which is divided into paging zones according to a zone-based paging scheme. As shown, the base stations 14-30 are grouped into zones A, B, and C to facilitate zone-based paging as described above. In particular, each base station may broadcast a zone ID indicating its zone, and a WCD, such as WCD 64, may monitor the zone IDs broadcast in the coverage areas where the WCD is operating. When the WCD detects a change in zone ID, the WCD may then responsively register its presence in the new zone, so that the RAN would then know to page the WCD in that new zone.

In an exemplary embodiment, zones may be defined by MSCs (e.g., an MSC may create and/or assign zone IDs, assign base stations to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to WCD registration data 66. The WCD registration data 66 preferably comprises data that specifies per WCD where the WCD is currently registered, such as the zone in which the WCD is currently registered, among possibly other information. In an exemplary embodiment, the WCD registration data may take the form of a visitor location register (VLR) database, which holds a record per WCD in the MSC's service area. The WCD's current zone of registration can thus be indicated in the WCD's VLR record. Alternatively or additionally, the WCD registration data can take the form of a home location register (HLR) database that is accessible via the MSC 52. Still alternatively, the data may be stored internally at the MSC and/or base stations, or elsewhere in some other form.

Using the general paging strategy that is implemented in many RANs providing IS-2000 and/or EVDO service, a RAN can make up to three attempts to page a WCD. In particular, the MSC 52 may initiate a first attempt by sending a page to one or more base stations for transmission in the paging zone B in which the WCD is registered (i.e., the base stations in the paging zone in which the WCD is registered transmit the page record).

Then, if the first attempt is unsuccessful (e.g., the WCD does not acknowledge the page), the MSC initiates a second attempt by again sending the page record to the one or more base stations for transmission in the paging zone B in which the WCD is registered, and typically to one or more additional base stations for transmission in one or more adjacent zones (e.g., zones A and C) as well. If the second attempt also fails, then the MSC initiates a third attempt to page the WCD, which typically involves sending the page record to multiple base stations for a system-wide transmission of the page record (i.e., in all paging zones within the coverage area of the switch), although it is possible that a third attempt may be of a different scope as well. Furthermore, it should be understood that an exemplary embodiment may also be implemented in a RAN that does not implement zone-based paging, without departing from the scope of the invention.

III. Exemplary RAN Components

Figure 3:
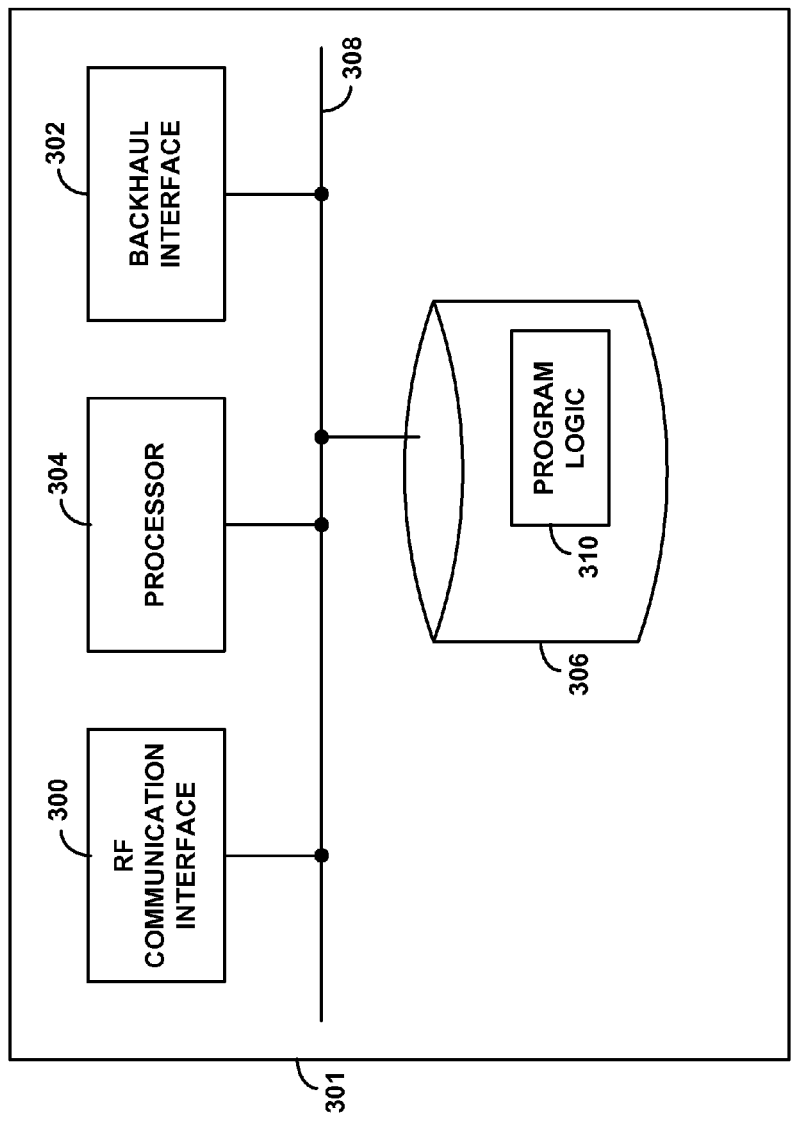
FIG. 3 is a simplified block diagram exemplifying a RAN component, according to an exemplary embodiment.

FIG. 3 is a simplified block diagram exemplifying a RAN component, according to an exemplary embodiment. In particular, FIG. 3 illustrates some of the functional components that would likely be found in a RAN component 301 arranged to operate in accordance with the embodiments herein. As shown, the RAN component 301 may include an RF communication interface 300, a backhaul interface 302, a processor 304, and data storage 306, all of which may be communicatively linked together by a system bus, network, or one or more other connection mechanisms 308.

In practice, RAN component 301 may take the form of or include one or more BTS and/or a BSC, such as BTSs 18-24 and/or BSC 50 for instance, or may take the form of a switch, such as MSC 52. Accordingly, the illustrated components of RAN component 301 (e.g., communication interface 300, a backhaul interface 302, a processor 304, and data storage 306) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

In RAN component 301, RF communication interface 300 may comprise one or more antenna structures, one or more power amplifiers, and associated equipment, for engaging in RF communication with mobile stations operating within the base station's coverage, according to one of the air interface protocols noted above for instance. Backhaul interface 302 may comprise any sort of communication link or mechanism enabling the base station to exchange signaling and bearer data with other RAN entities, such as with MSC 52 for instance. Processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functionality of the exemplary methods and systems described herein.

In an exemplary embodiment, data storage 306 may include program instructions that are executable by processor 304 to: (a) determine, for each of one or more paging zones of the RAN, a respective measure of CSFB-device prevalence in the paging zone, (b) use the respectively determined measure of CSFB-device prevalence in at least one of the paging zones as a basis to determine one or more parameters for zone-based paging in the at least one of the paging zones, and (c) apply the one or more determined parameters for zone-based paging in the at least one of the paging zones.

Figure 4:
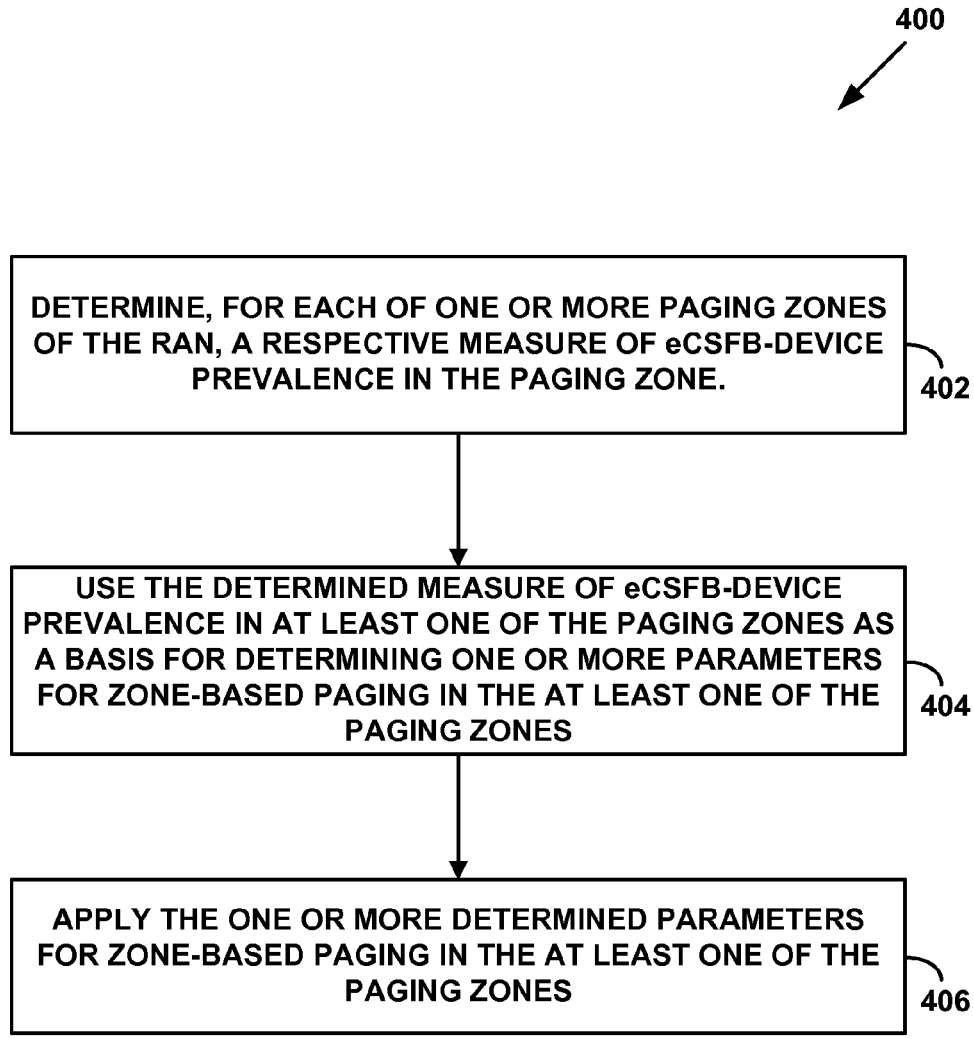
FIG. 4 is a flow chart illustrating a method 400, according to an exemplary embodiment.

IV. Exemplary Methods to Adjust Zone-Based Paging Based on eCSFB-Device Prevalence FIG. 4 is a flow chart illustrating a method 400, according to an exemplary embodiment. Method 400 may be implemented at a component or components of a RAN, such as at a base station and/or at a switch. Herein, method 400 is described as being implemented by a switch or switches in a RAN (e.g., by an MSC, MME, and/or an IWF). However, other implementations are possible. Further, method 400 may be implemented in a RAN that is configured to provide service under both a first and a second air-interface protocol (e.g., both a CDMA protocol such as IS-2000 and/or EV-DO, and LTE).

Further, a RAN that implements method 400 may be configured to send a given page type (e.g., a CDMA page message) to a non-CSFB device via a first paging channel defined under a first air-interface protocol and to send the given page type to CSFB devices via a second paging channel defined under a second air-interface protocol. For instance, the RAN may use CDMA paging channels to send CDMA paging-channel messages to non-CSFB devices, but use LTE paging channels for CDMA paging-channel messages to CSFB devices. Accordingly, when a RAN that implements eCSFB pages a non-CSFB device, the RAN may utilize a zone-based paging scheme and/or an intersystem paging scheme, such as those described above.

Referring to FIG. 4, method 400 involves a switch determining, for each of one or more paging zones of the RAN, a respective measure of CSFB-device prevalence in the paging zone, as shown by block 402. The switch then use the determined measure of CSFB-device prevalence in at least one of the paging zones as a basis for determining one or more parameters for zone-based paging in the at least one of the paging zones, as shown by block 404. The switch may then apply the one or more determined parameters for zone-based paging in the at least one of the paging zones, as shown by block 406.

V. Determining CSFB-Device Prevalence in a Paging Zone

Generally, the measure of CSFB-device prevalence in a paging zone may be a quantitative indication of how prevalent CSFB-devices have been, how prevalent CSFB-devices currently are, and/or how prevalent CSFB-devices are expected to be, in the given coverage area. Thus, at block 402 of method 400, a switch may determine the measure of CSFB-device prevalence in various ways, depending upon the particular implementation. Further, the measure of CSFB-device prevalence in a given paging zone may be based only on the devices capable of CSFB, only on the devices capable of eCSFB, or on devices that are capable of CSFB, eCSFB, or both.

For example, a switch and/or other RAN component(s) may determine a respective value for CSFB-device prevalence in each of the coverage areas within a given paging zone (e.g., within each sector of the paging zone), and then calculate the sum of the determined values or otherwise combine the determined values, to determine the measure of CSFB-device prevalence for the paging zone as a whole.

In some embodiments, the measure of CSFB-device prevalence in a particular coverage area (e.g., a particular sector) may be equal to or otherwise based on the number of CSFB devices that are associated with the coverage area. In such an embodiment, the RAN may determine the measure of CSFB-device prevalence by determining how many CSFB devices are currently registered in a given sector.

Further, in some embodiments, the measure of CSFB-device prevalence in a given coverage area may be calculated to be equal to, or otherwise based upon, the percentage of all the devices associated with the coverage area that are CSFB devices. For example, the RAN may determine the measure of CSFB-device prevalence by determining the number of CSFB devices that are currently registered in the coverage area, and the total number of devices (both eCSFB and non-CSFB) that are currently registered in the coverage area. The RAN may then determine the percentage of all devices that are eCSFB-compatible by dividing the current number of CSFB devices by the total number of devices that are currently registered in the coverage area.

Additionally or alternatively, the measure of CSFB-device prevalence in a given coverage area may be based on historical presence of CSFB-devices in a coverage area. For example, CSFB-device prevalence may be determined based on the average number of CSFB-devices that operate in a sector at a given point in time. More specifically, the RAN may periodically or from time-to-time determine how many CSFB devices are currently registered in the sector, and maintain a database of this information on a per-sector basis. The RAN may then calculate CSFB-device prevalence to be equal to, or to be otherwise based on, the average number of CSFB devices that are registered in the coverage area at a given point in time. The average may be determined over all time, or may be determined as a moving average over a certain period of time.

As another example, CSFB-device prevalence in a given coverage area may be determined based on the historical percentage of devices in the coverage area that are eCSFB-compatible. For instance, the RAN may include or have access to a database that includes historical records indicating whether or not devices that register in a given coverage area are eCSFB-compatible (e.g., whether or not each device that registers is configured for communications under both LTE and a CDMA protocol). The RAN may then access this data to calculate CSFB-device prevalence by, e.g., determining the historical percentage of the devices that register in a given coverage area that are eCSFB-compatible. This historical percentage may be determined over all time or over a predetermined window of time (e.g., by determining the percentage of devices that are eCSFB-compatible over the last hour, the last day, the last week, etc.).

Note that when a WCD registers with the RAN in a given coverage area or zone, the WCD may include, in its registration message, an indication as to whether it is capable of CSFB and/or eCSFB. This information may be stored by the RAN in a database, such that the information can be accessed to determine the CSFB-capability and/or the eCSFB-capability of devices in a given paging zone, so that CSFB-device prevalence can be determined for the given paging zone.

It should be understood that the above-described techniques for determining a measure of CSFB-device prevalence in a coverage area are provided for illustrative purposes, and are not intended to be limiting. Other measures of CSFB-device prevalence in coverage area, and other techniques for determining such measures, are also possible.

Further, in some embodiments, the CSFB-device prevalence for a paging zone may be calculated without calculating the CSFB-device prevalence in the individual coverage areas within the paging zone. For example, a RAN may track when WCDs are located in certain paging zones directly, such that the presence of CSFB-devices and non-CSFB-devices in particular paging zones can be determined directly (rather than determining, for example, that a device is in a given coverage area, and then determining that the coverage area is in a certain paging zone). In such an embodiment, the CSFB-device prevalence for a single paging zone that includes multiple coverage areas may be calculated in the same or similar manner as described above with reference CSFB-device prevalence in a single coverage area.

VI. Determining Zone-Based Paging Parameters Based on eCSFB-Device Presence

As noted above, a RAN that implements method 400 may use paging channels that are defined under a first air-interface protocol to page non-CSFB devices, and instead use paging channels defined under a second air-interface protocol to send paging-channel messages to CSFB devices. For instance, a base station may use the LTE paging channel for both CDMA and LTE paging to CSFB devices. However since non-CSFB device may not be capable of communications under LTE (or, if configured for LTE communications, may not know to listen to the LTE paging channel for CDMA pages), the base station may use a CDMA paging channel for CDMA paging to non-CSFB devices.

In such a configuration, block 404 may involve the RAN determining one or more parameters for zone-based paging under CDMA. Such zone-based paging parameters may include, but are not limited to: (a) a maximum-attempt parameter, which specifies a maximum number of attempts to send the page that can be made under a zone-based paging scheme, (b) a duration of the page-attempt timer for zone-based paging, and/or (c) one or more parameters that affect the scope of paging attempts during zone-based paging. Other zone-based paging parameters may additionally or alternatively be adjusted based on eCSFB-device prevalence, without departing from the scope of the invention.

A. Determining a Maximum-Attempt Parameter for Zone-Based Paging

As noted above, a switch may determine and set the maximum-attempt parameter for zone-based paging based on eCSFB-device prevalence. As further noted above, the maximum-attempt parameter specifies the maximum number of attempts that can be made to send a given page during the zone-based paging process. In an exemplary embodiment, a switch may increase the value of the maximum-attempt parameter for zone-based paging via CDMA paging channels as the CSFB-device prevalence increases, and vice versa.

In some embodiments, block 404 may involve a switch adjusting the maximum-attempt parameter for all of the paging zones in the coverage area served by the switch. For instance, the switch may determine the respective CSFB-device prevalence in each zone within its coverage area. Then, if the respective CSFB-device prevalence in all of the paging zones in the switch's coverage area is above a threshold level, the switch may increase the value of the maximum-attempt parameter for all of the paging zones in its coverage area. Alternatively, the switch could increase the value of the maximum-attempt parameter for all paging zones in its coverage area when the respective CSFB-device prevalence in at least a certain number or certain percentage of the paging zones in the switch's coverage area is greater than the threshold level.

In other embodiments, block 404 may involve a switch adjusting maximum-attempt parameters for individual paging zones in its coverage area. For example, a switch may determine the CSFB-device prevalence in a particular paging zone, and then adjust a maximum-attempt parameter for that particular zone based on the determined eCSFB-device prevalence. Further, the switch may repeat this process to determine per-zone maximum-attempt parameters for some or all paging zones in its coverage area.

In yet other embodiments, block 404 may involve a more granular determination of the maximum-attempt parameter for a paging zone (or for multiple paging zones). For example, multiple ranges of CSFB-device prevalence may be defined, with each range corresponding to a different value for the maximum-attempt parameter (typically with the corresponding value of the maximum-attempt parameter increasing as the CSFB-device prevalence increases). As a specific example, if the CSFB-device prevalence is between zero and 30% in a paging zone, then the switch may set the maximum-attempt parameter equal to three attempts (e.g., the default setting in some existing zone-based paging schemes). However, if the CSFB-device prevalence is between 30% and 60% in a paging zone, then the switch may set the maximum-attempt parameter equal to four attempts. And, if the CSFB-device prevalence is greater than 60% in a paging zone, then the switch may set the maximum-attempt parameter equal to five attempts. It should be understood that variations on this example and many other examples are also possible.

B. Determining a Duration of a Page-Attempt Timer for Zone-Based Paging

At block 404, the RAN may additionally or alternatively determine and set the duration of the page-attempt timer for one or more paging zones based on the CSFB-device prevalence in the one or more zones. As noted above, the duration of the page-attempt timer is the time between successive paging attempts in zone-based paging. Accordingly, a base station may generally reduce the duration of the page-attempt timer for a zone as the CSFB-device prevalence in the zone increases, and vice versa.

In some embodiments, block 404 may involve a switch adjusting the duration of the page-attempt timer that applies to all paging zones in the coverage area served by the switch. In other embodiments, block 404 may involve a switch independently adjusting the duration of a page-attempt timer for each of one or more individual paging zones in its coverage area. In yet other embodiments, block 404 may involve a more granular determination of the maximum-attempt parameter for a paging zone (or for multiple paging zones); e.g., by defining three or more ranges of CSFB-device prevalence that each corresponds to a different duration.

In a further aspect, when a switch decreases or increases the duration of the page-attempt timer based on eCSFB-device prevalence, the switch may do so in conjunction with increasing or decreasing the value of the maximum-attempt parameter, respectively. By doing so, the switch may increase the number of attempts that are made in a given period of time.

For example, standard settings specify that a maximum of three attempts can be made, and that the switch should wait ten seconds for a PRM before initiating a subsequent paging-attempt. Therefore, under the standard settings the RAN can make up to three attempts to send the page in a 20-second timeframe. When the CSFB-device prevalence is greater than a predetermined threshold, the switch may set the maximum number of attempts to six, and decrease the duration of the page-attempt timer to four seconds. As such, up to six attempts to send a given page can be made in the same 20-second timeframe. It should be understood that this is but one possible combination of settings for the maximum-attempt parameter and page-attempt timer, and many other combinations are also possible C. Determining the Scope of Paging Attempts in a Zone-Based Paging Scheme At block 404, the RAN may additionally or alternatively determine and set the scope of some or all page attempts in a zone-based paging scheme, based on the measure of CSFB-device prevalence determined at block 402.

For example, if the CSFB-device prevalence is greater than a predetermined threshold, then the switch may adjust the settings for zone-based paging on CDMA paging-channels such that the all attempts to send the page involve system-wide transmission of the page (i.e., transmission in the entire coverage area served by the switch). As a specific example, if the maximum-attempt parameter is set to three attempts, then the switch may send the page in all paging zones in its coverage on the first, second, and third attempt. On the other hand, if the CSFB-device prevalence is less than the threshold, then the switch may use standard settings for zone-based paging, which may specify, for example, that the first and second page attempt be transmitted in the zone in which the target WCD is registered, and that only the third page attempt should be transmitted system-wide.

Variations on the above example and other examples of a switch adjusting the scope of page attempts are also possible. As another example, when the CSFB-device prevalence is greater than the threshold, the switch may still limit the page to the zone in which the WCD is registered on the first attempt, and then expand to system-wide transmission on the second and third attempt. Other examples are also possible.

VI. Conclusion

It should be understood that the above parameters for zone-based paging may be adjusted alone or in various combinations, based upon the roaming-likelihood indicator. Furthermore, the above description of paging-scheme settings that may be adjusted is not intended to be limiting. Other paging-scheme settings of the switch may also be adjusted, either instead of, or in various combinations with, the above-described paging-scheme settings.

More generally, it should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A computer-implemented method comprising:
at a component of a radio access network (RAN) configured for enhanced circuit switch fallback (eCSFB), wherein the RAN includes a plurality of paging zones that comprise one or more coverage areas, wherein the RAN is configured to send a given page type to non-CSFB devices via one or more first paging channels defined under a first air-interface protocol and to send the given page type to CSFB devices via one or more second paging channels defined under a second air-interface protocol, determining, for each of one or more of the paging zones, a respective measure of CSFB-device prevalence in the paging zone, wherein the respectively determined measure of CSFB-device prevalence for a given paging zone indicates a percentage of devices in the paging zone that are configured for CSFB;
using the respectively determined measure of CSFB-device prevalence in at least one of the paging zones as a basis for determining one or more parameters for zone-based paging in the at least one of the paging zones; and
applying the one or more determined parameters for zone-based paging in the at least one of the paging zones.

2. The method of claim 1, wherein the first air-interface protocol comprises a CDMA protocol, and wherein the second air-interface protocol comprises an LTE protocol.

3. The method of claim 1, wherein determining the one or more parameters for zone-based paging comprises determining a maximum-attempt parameter for zone-based paging.

4. The method of claim 1, wherein determining the one or more parameters for zone-based paging comprises determining a duration of a page-attempt timer for zone-based paging.

5. The method of claim 1, wherein determining the one or more parameters for zone-based paging comprises determining a scope for one or more page attempts in a zone-based paging scheme.

6. The method of claim 1, wherein using the respectively determined measure of CSFB-device prevalence in at least one of the paging zones as a basis for determining one or more parameters for zone-based paging in the at least one of the paging zones comprises:
   if the measure of CSFB-device prevalence is less than a threshold, then adjusting the one or more parameters for zone-based paging according to a first paging scheme; and
   if the measure of CSFB-device prevalence is greater than a threshold, then adjusting the one or more parameters for zone-based paging according to a second paging scheme, wherein the second paging scheme increases the likelihood of successfully paging a device as compared to the first paging scheme.

7. The method of claim 1, wherein determining the one or more parameters for zone-based paging comprises two or more of: (a) determining a maximum-attempt parameter for zone-based paging, (b) determining a duration of a page-attempt timer for zone-based paging, and (c) determining a scope for one or more page attempts in a zone-based paging scheme.

8. A computer-implemented method comprising:
   at a component of a radio access network (RAN) configured for enhanced circuit switch fallback (eCSFB), wherein the RAN includes a plurality of paging zones that comprise one or more coverage areas, wherein the RAN is configured to send a given page type to non-CSFB devices via one or more first paging channels defined under a first air-interface protocol and to send the given page type to CSFB devices via one or more second paging channels defined under a second air-interface protocol, determining, for each of one or more of the paging zones, a respective measure of CSFB-device prevalence in the paging zone, wherein the respective measure of CSFB-device prevalence for a given paging zone comprises a number of CSFB devices that are in the paging zone that are configured for CSFB;
   using the respectively determined measure of CSFB-device prevalence in at least one of the paging zones as a basis for determining one or more parameters for zone-based paging in the at least one of the paging zones; and
   applying the one or more determined parameters for zone-based paging in the at least one of the paging zones.

9. A non-transitory computer readable medium having stored therein instructions that are executable to cause at least one component of a radio access network (RAN) to perform functions comprising:
   determining, for each of one or more paging zones of the RAN, a respective measure of enhanced circuit switch fallback (eCSFB) device prevalence in the paging zone, wherein the RAN is configured for eCSFB and includes a plurality of paging zones that each comprise one or more coverage areas, and wherein the RAN is configured to send a given page type to non-CSFB devices via one or more first paging channels defined under a first air-interface protocol and to send the given page type to CSFB devices via one or more second paging channels defined under a second air-interface protocol, wherein the respectively determined measure of CSFB-device prevalence for a given paging zone indicates a percentage of devices in the paging zone that are configured for CSFB;
   using the respectively determined measures of CSFB-device prevalence in at least one of the paging zones as a basis for determining one or more parameters for zone-based paging in the at least one of the paging zones; and
   applying the one or more determined parameters for zone-based paging in the at least one of the paging zones.

10. The computer readable medium of claim 9, wherein the first air-interface protocol comprises a CDMA protocol, and wherein the second air-interface protocol comprises an LTE protocol.

11. The computer readable medium of claim 9, wherein determining the one or more parameters for zone-based paging comprises determining a maximum-attempt parameter for zone-based paging.

12. The computer readable medium of claim 9, wherein determining the one or more parameters for zone-based paging comprises determining a duration of a page-attempt timer for zone-based paging.

13. The computer readable medium of claim 9, wherein determining the one or more parameters for zone-based paging comprises determining a scope for one or more page attempts in a zone-based paging scheme.

14. A radio-access-network (RAN) component comprising:
   a non-transitory computer readable medium;
   program instructions stored on the non-transitory computer readable medium an executable by at least one processor to:
   (a) determine, for each of one or more paging zones of the RAN, a respective measure of enhanced circuit switch fallback (eCSFB) device prevalence in the paging zone, wherein the RAN is configured for eCSFB and includes a plurality of paging zones that each comprise one or more coverage areas, and wherein the RAN is configured to send a given page type to non-CSFB devices via one or more first paging channels defined under a first air-interface protocol and to send the given page type to CSFB devices via one or more second paging channels defined under a second air-interface protocol, wherein the respectively determined measure of eCSFB-device prevalence for a given paging zone indicates a percentage of devices in the paging zone that are configured for eCSFB;
   (b) use the respectively determined measure of CSFB-device prevalence in at least one of the paging zones as a basis to determine one or more parameters for zone-based paging in the at least one of the paging zones; and
   (c) apply the one or more determined parameters for zone-based paging in the at least one of the paging zones.

15. The RAN component of claim 14, wherein the first air-interface protocol comprises a CDMA protocol, and wherein the second air-interface protocol comprises an LTE protocol.

16. The RAN component of claim 14, wherein the one or more parameters for zone-based paging comprise a maximum-attempt parameter for zone-based paging.

17. The RAN component of claim 14, wherein the one or more parameters for zone-based paging comprise a duration of a page-attempt timer for zone-based paging.

18. The RAN component of claim 14, wherein the one or more parameters for zone-based paging comprise a respective scope for one or more page attempts in a zone-based paging scheme.

19. The RAN component of claim 14, wherein the RAN component is implemented in or takes the form of a switch.

* * * * *